(12) United States Patent
Louis (10) Patent No.: US 7,343,863 B2
(45) Date of Patent: Mar. 18, 2008

(54) SELF-RIGHTING, BI-DIRECTIONAL PIPE CASTER

(75) Inventor: James Louis, Chicago, IL (US)

(73) Assignee: Gas Technology Institute, Des Plaines, IL (US)

( * ) Notice: Subject to any disclaimer, the term of this patent is extended or adjusted under 35 U.S.C. 154(b) by 327 days.

(21) Appl. No.: 11/089,748

(22) Filed: Mar. 25, 2005

(65) Prior Publication Data

US 2006/0213388 A1    Sep. 28, 2006

(51) Int. Cl.
*B61B 13/10* (2006.01)
(52) U.S. Cl. .................................................. 104/138.2
(58) Field of Classification Search ............. 104/138.1, 104/138.2, 139
See application file for complete search history.

(56) References Cited

U.S. PATENT DOCUMENTS

| 4,526,106 A | * | 7/1985 | Okada et al. | ............ | 104/138.2 |
| 6,035,786 A | * | 3/2000 | McKay et al. | ........... | 104/138.1 |
| 6,339,993 B1 | * | 1/2002 | Comello et al. | ......... | 104/138.2 |

* cited by examiner

*Primary Examiner*—S. Joseph Morano
*Assistant Examiner*—Robert J. McCarry, Jr.
(74) *Attorney, Agent, or Firm*—Mark E. Fejer (57) ABSTRACT

An apparatus for transporting a payload along the inside of a substantially horizontal pipe. The apparatus includes vertically aligned upper and lower roller elements which are relationally pivotably connected to each other, both of which contact the inside surface of the pipe into which the apparatus is inserted. The apparatus further includes a steering pendulum which enables the apparatus to maintain a substantially vertical orientation as it is pushed or pulled through the pipe.

15 Claims, 6 Drawing Sheets

SELF-RIGHTING, BI-DIRECTIONAL PIPE CASTER

BACKGROUND OF THE INVENTION

1. Field of the Invention

This invention relates to an apparatus for steering or otherwise guiding a payload through the inside of a substantially horizontal pipe. More particularly, this invention relates to an apparatus for transporting instrumentation or other equipment for internal inspection, maintenance and/or repair of an underground pipe, such as a utility pipeline, which apparatus automatically maintains a substantially vertical orientation within the pipe as it moves through the pipe. Typically, the payload is mounted to a support that is pulled or pushed or otherwise motivated along the centerline of the pipe.

2. Description of Related Art

Internal inspection, maintenance and repair of underground utility pipelines is frequently utilized to avoid expensive excavation of the ground surrounding the pipeline. In addition to being expensive, excavation offers the potential for damage to the pipeline resulting, for example, from contact with the excavation equipment.

Tools for internal pipeline inspection perform a wide variety of specific functions, such as geometric surveys, determination of metal loss, and detection of cracks or leaks. Conventional means for transporting such tools through the inside of the pipeline have a tendency to tip or otherwise spiral within the pipeline as they travel along the pipeline. To provide the accuracy required for internal pipeline inspection, it is important to be able to maintain a fixed radial orientation while traveling through the pipe. Any imbalance in the conveyance apparatus seen by the payload can cause it to ride up the pipe wall. This, in turn, can cause the payload carriage to spiral as it moves through the pipe and, in some instances, may even cause the payload carriage to become immobilized if it flips over. This spiraling is avoided by ensuring that the payload carriage follows the "valley" or lowest point of the pipe interior as it travels through the pipe.

SUMMARY OF THE INVENTION

It is, therefore, one object of this invention to provide an apparatus for transporting a payload through the inside of a substantially horizontal pipe, which apparatus automatically maintains a substantially vertical orientation within the pipe as it travels through the pipe.

This and other objects of this invention are addressed by an apparatus for transporting a payload along the inside of a substantially horizontal pipe comprising a rollable upper pipe tracking contactor and a rollable lower pipe tracking contactor. The upper pipe tracking contactor is vertically spaced apart from, and pivotably connected with, the lower pipe tracking contactor. The connection is relationally pivotable such that pivoting of the lower pipe tracking contactor in one direction will result in pivoting of the upper pipe tracking contactor in the opposite direction. The apparatus further comprises at least one substantially horizontal elongated lever element or steering pendulum having weighted ends and in non-fixed, tractional contact with the lower pipe tracking contactor such that the weighted end of the elongated lever element disposed in front of the apparatus is substantially aligned with the direction of travel of the lower pipe tracking contactor. As used herein, the term "front" of the apparatus of this invention refers to the direction of travel of the apparatus. Thus, when the direction of travel of the apparatus of this invention is reversed, the "back" of the apparatus becomes the "front" of the apparatus and what was the "front" of the apparatus when traveling in the first direction becomes the "back" of the apparatus. That is to say, the apparatus of this invention is bi-directional.

BRIEF DESCRIPTION OF THE DRAWINGS

These and other objects and features of this invention will be better understood from the following detailed description taken in conjunction with the drawings, wherein.

DETAILED DESCRIPTION OF THE PRESENTLY PREFERRED EMBODIMENTS

The invention disclosed herein is a self-righting, bi-directional pipe caster which employs a gravity corrected caster mechanism that causes the payload carriage with which the pipe caster is associated to follow the lowest point of a pipe interior as it travels through the pipe. To move a payload through a pipe, at least two self-righting, bi-directional casters are required.

Figure 1:
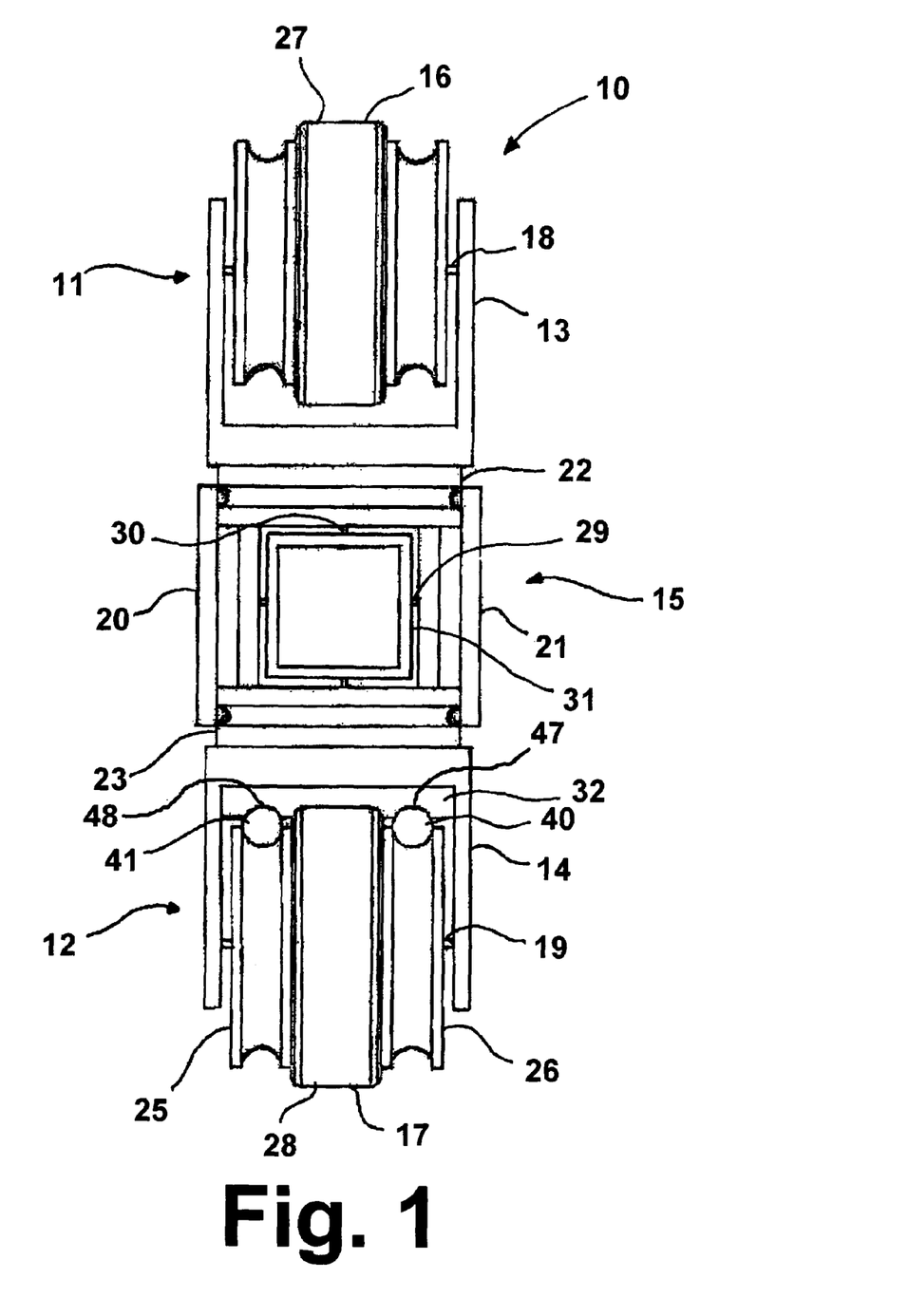
FIG. 1 is a front view of the self-righting, bi-directional pipe caster in accordance with one embodiment of this invention but without the elongated lever element.

A single pipe caster 10, as shown in FIG. 1, in accordance with one embodiment of this invention, comprises two substantially identical pipe tracking contactors, an upper pipe tracking contactor 11 and a lower pipe tracking contactor 12, which are positioned vertically with respect to each other so that they contact the top and bottom, respectively, of the inside surface of the pipe into which the caster is inserted. Upper pipe tracking contactor 11 comprises at least one rollable upper contact element 16 disposed in an upper contact element carriage or housing 13 and lower pipe tracking contactor 12 comprises at least one rollable lower contact element 17 disposed in a lower contact element carriage or housing 14. Suitable rollable upper and lower contact elements include, but are not limited to, balls and wheels. In accordance with one embodiment of this invention, the rollable upper and lower contact elements 16, 17 comprise substantially identical elastomer tires 27, 28 which provide tractional contact with the inside surface of the pipe. The tire diameters, as well as the entire pipe caster assembly, are proportional to the size of the pipe in which it is intended to be used.

In accordance with one embodiment of this invention, the upper contact element carriage or housing 13 in which the upper rollable contact element 16 is disposed is an upward facing U-shaped profile and the lower contact element carriage or housing 14 in which the lower rollable contact element 17 is disposed is a downward facing U-shaped profile. Upper rollable contact element 16 is pivotably connected by means of an upper roller pivot 18 to the upward facing U-shaped profile and the lower rollable contact element 17 is pivotably connected by means of a lower roller pivot 19 to the downward facing U-shaped profile. To ensure contact between the upper rollable contact element and the inside surface of the pipe, the upper pipe tracking contactor 11 further comprises at least one spring loaded element 45 (FIG. 3) connected with the side wall of the upward facing U-shaped profile and the upper rollable contact element 16 and adapted to apply a force on the upper rollable contact element 16 in the direction of the pipe surface.

The upper pipe tracking contactor 11 is connected with the lower pipe tracking contactor 12 by a relational pivot means 15 whereby the lower pipe tracking contactor 12 counter-rotates the upper pipe tracking contactor 11 proportional to the tracking angle of the lower pipe tracking contactor 12. The relational pivot means may be in the form of a plurality of pulleys and a belt or, alternatively, in the form of a plurality of bevel gears. It will be understood that any mechanical linkage which provides the relational pivoting of the upper and lower pipe tracking contactors described herein is deemed to be within the scope of this invention.

Figure 2:
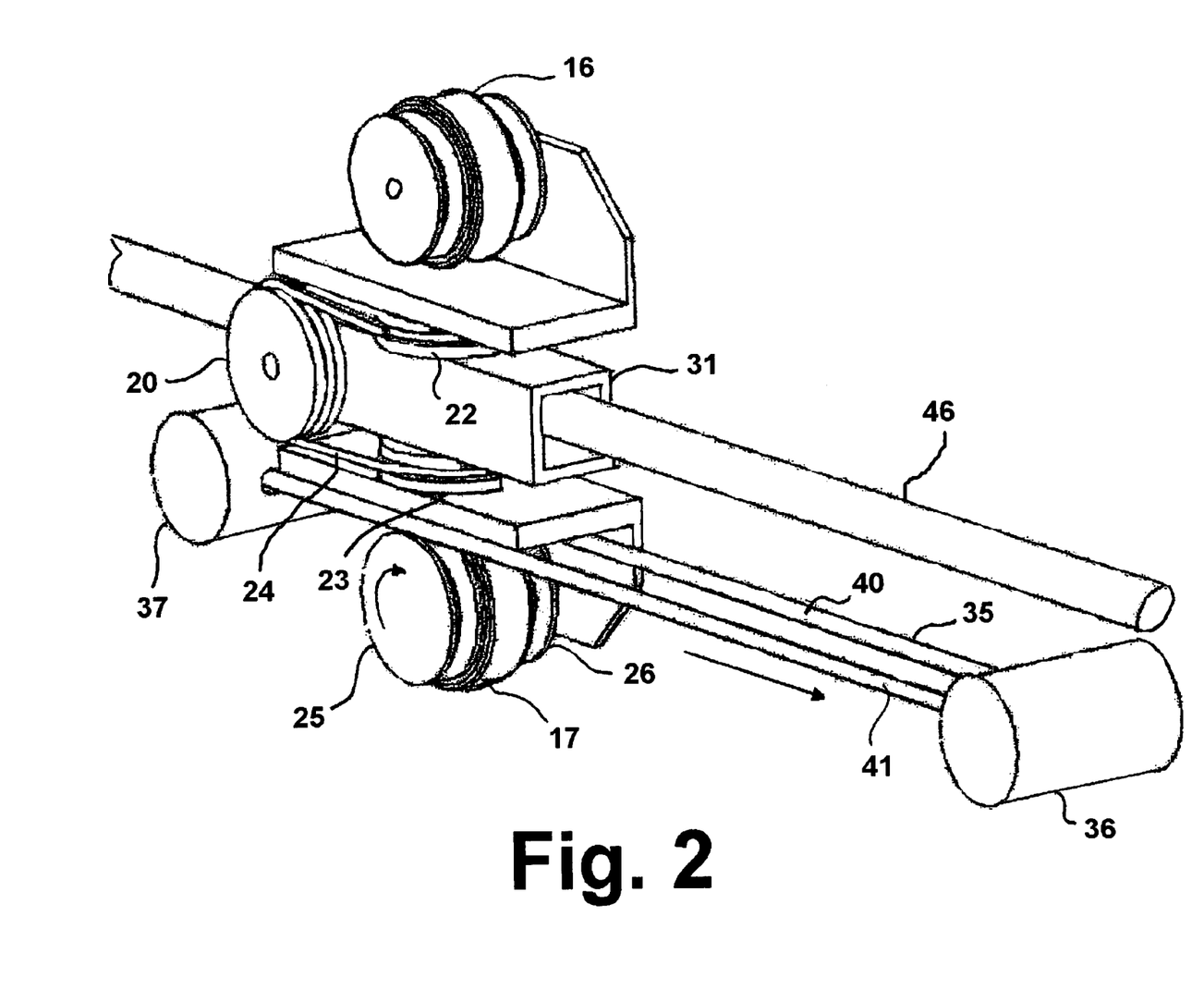
FIG. 2 is a perspective view of a portion of the self-righting, bi-directional pipe caster in accordance with one embodiment of this invention.

In accordance with one preferred embodiment of this invention, the relational pivot means comprises an upper horizontally oriented pulley 22 fixedly connected to the bottom of the upward facing U-shaped profile, a lower horizontally oriented pulley 23 fixedly connected to the top of the downward facing U-shaped profile, and pivot means for pivotably connecting the upper horizontally oriented pulley with the lower horizontally oriented pulley. In accordance with one preferred embodiment of this invention, the pivot means, more clearly shown in FIG. 2, comprises an intermediate connecting member 31 disposed between, and pivotably connected with, the upper horizontally oriented pulley 22 and the lower horizontally oriented pulley 23, two vertically oriented pulleys 20, 21 pivotably connected on opposite sides with the intermediate connecting member 31, and a drive belt 24 disposed around the horizontal and vertical pulleys whereby pivoting of one of the pulleys results in pivoting of the remaining pulleys and pivoting of the lower pipe tracking contactor 11 in one direction results in pivoting of the upper pipe tracking contactor 11 in the opposite direction. In accordance with one embodiment of this invention, intermediate connecting member 31 is in the form of an elongated hollow member as shown in FIG. 2. In accordance with another embodiment of this invention, the intermediate connecting member 31 is a solid structure as shown in FIG. 3.

Figure 3:
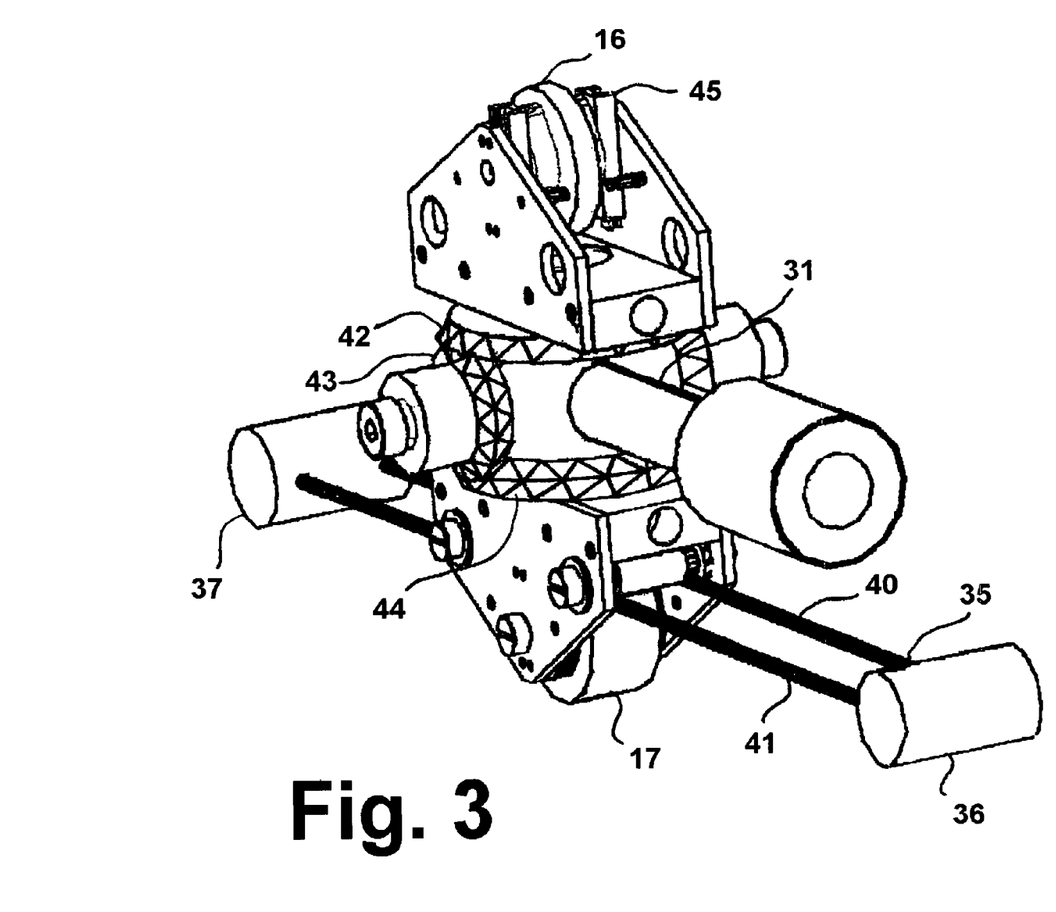
FIG. 3 is a perspective view of a self-righting, bi-directional pipe caster in accordance with one embodiment of this invention.

In accordance with a further embodiment of this invention as shown in FIG. 3, the pivot means for pivotably connecting the upper pipe tracking contactor 11 with the lower pipe tracking contactor 12 comprises a plurality of bevel gears 42, 43 and 44. The bevel gears are align so as to provide the relational pivoting of the upper and lower pipe tracking contactors as described herein above. That is, pivoting of the lower pipe tracking contactor 12 in one direction results in pivoting of the upper pipe tracking contactor 11 in the opposite direction.

As previously indicated, the payload to be moved within the pipe is mounted on a support which, in turn, is operably connected to the pipe caster of this invention. Also, as previously indicated, at least two pipe casters will normally be required to move the payload. The use of an intermediate connecting element 31 in the form of an elongated hollow member as part of the pivot means as discussed herein above enables longitudinal insertion of a support rod 46 as shown in FIG. 2 into the hollow member. Thus, the use of two pipe casters, one at each end of the support rod, enables substantially co-axial alignment of the support rod as the pipe casters move the payload disposed thereon through the pipe.

Figure 4:
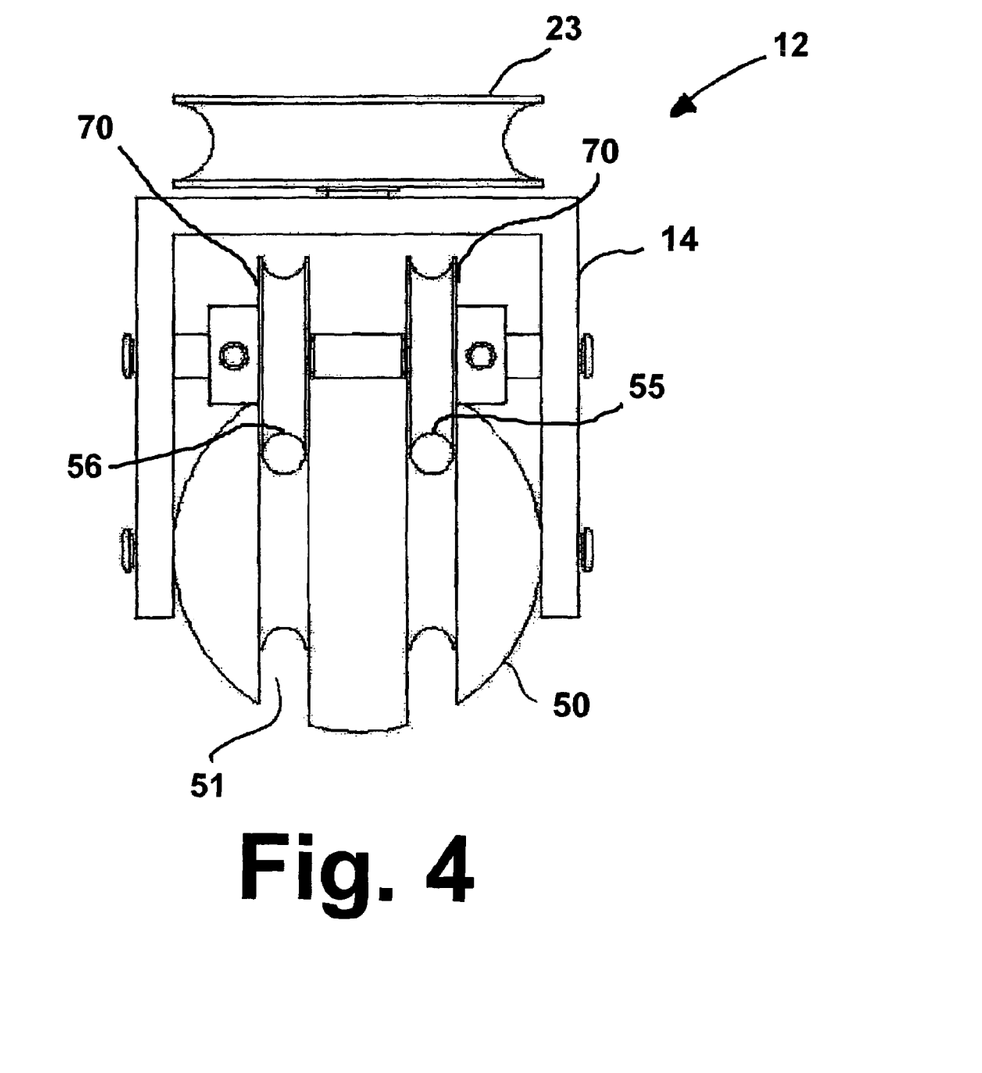
FIG. 4 is a front view of a lower pipe tracking contactor in accordance with one embodiment of this invention.

Control of the tracking angle of the upper and lower pipe tracking contactors in accordance with one embodiment of this invention is provided by an elongated steering pendulum 35 as shown in FIGS. 2 and 3 comprising two weighted ends. The elongated steering pendulum 35 in accordance with one embodiment of this invention comprises two rods 40, 41 to the ends of which weights 36, 37 are attached. The rods 40, 41 are advanced to their operating position by means of contact with pendulum transport means for advancing the steering pendulum in the direction of travel of the lower pipe tracking contactor 12. In accordance with one embodiment of this invention in which lower rollable contact element 17 is a wheel, the pendulum transport means comprises two pulleys 25, 26, one of which is fixedly connected with each side of the wheel as shown in FIGS. 1 and 2. In accordance with another embodiment of this invention in which the lower rollable contact element 17 is a ball 50 as shown in FIG. 4, the pendulum transport means are in the form of grooves 51 which contact the bottom portion of the rods 40, 41. In accordance with either embodiment, the fulcrum points of the rods 40, 41 of the elongated steering pendulum 35 move whenever the pipe caster is pushed or pulled, thereby providing the pipe caster with bi-directional capabilities. The fulcrum points correspond to the points of contact between the rods and the lower rollable contact element.

Critical to the proper functioning of the pipe caster of this invention is the requirement that the elongated steering pendulum 35 remain substantially horizontal at all times. This requirement is fulfilled by horizontal stabilizing means for maintaining the elongated steering pendulum in a substantially horizontal orientation. More particularly, substantially horizontal orientation of the elongated steering pendulum is maintained by horizontal stabilizing elements disposed ahead of and behind the fulcrum points of the steering pendulum 35. In accordance with one embodiment of this invention, the horizontal stabilizing means comprises at least one grooved element connected with the rollable lower contact element carriage 14 and having at least one horizontal alignment groove in alignment with each groove of the pulley transport means, e.g. the grooves of pulleys 25 and 26 and the grooves 51 of ball 50, and positioned to contact the top side of each rod 40, 41 ahead of and behind the fulcrum points. To ensure horizontal disposition of the elongated steering pendulum, the contact points between the horizontal alignment grooves and the top side of rods 40, 41 ahead of and behind the fulcrum points are disposed in the same horizontal plane.

In accordance with one embodiment of this invention, the horizontal stabilizing means comprises at least one grooved block 32, as shown in FIG. 1, which at least one grooved block is connected with the rollable lower contact element carriage 14. In accordance with one preferred embodiment of this invention, two grooved blocks are provided, one connected with a front of the rollable lower contact element carriage and the other with a back of the rollable lower contact element carriage. To provide the necessary slippage at the contact points between the horizontal alignment grooves and the top side of rods 40, 41 ahead of and behind the fulcrum points, the horizontal alignment grooves are coated with a non-stick material, such as TEFLON. In accordance with another preferred embodiment of this invention, the horizontal stabilization means comprises two pairs of spaced apart pulleys, a first pair 70 disposed ahead of the fulcrum points and a second pair 71 disposed behind the fulcrum points as shown in FIGS. 4 and 5.

In operation, rotation of the lower rollable contact element always pushes the weight at the end of the steering pendulum toward the direction of travel of the pipe caster, allowing gravity to control the tracking angle of both the upper and lower pipe tracking contactors. The angle of the lower pipe tracking contactor is controlled by the steering pendulum, which swings into the spiraling of the payload. This motion is distinct from the forward movement of the pendulum by the pendulum transport means. The swinging of the steering pendulum occurs when the pipe caster spirals or tips away from being vertical, and it directly controls the tracking angle of the lower rollable contact element.

Figure 5:
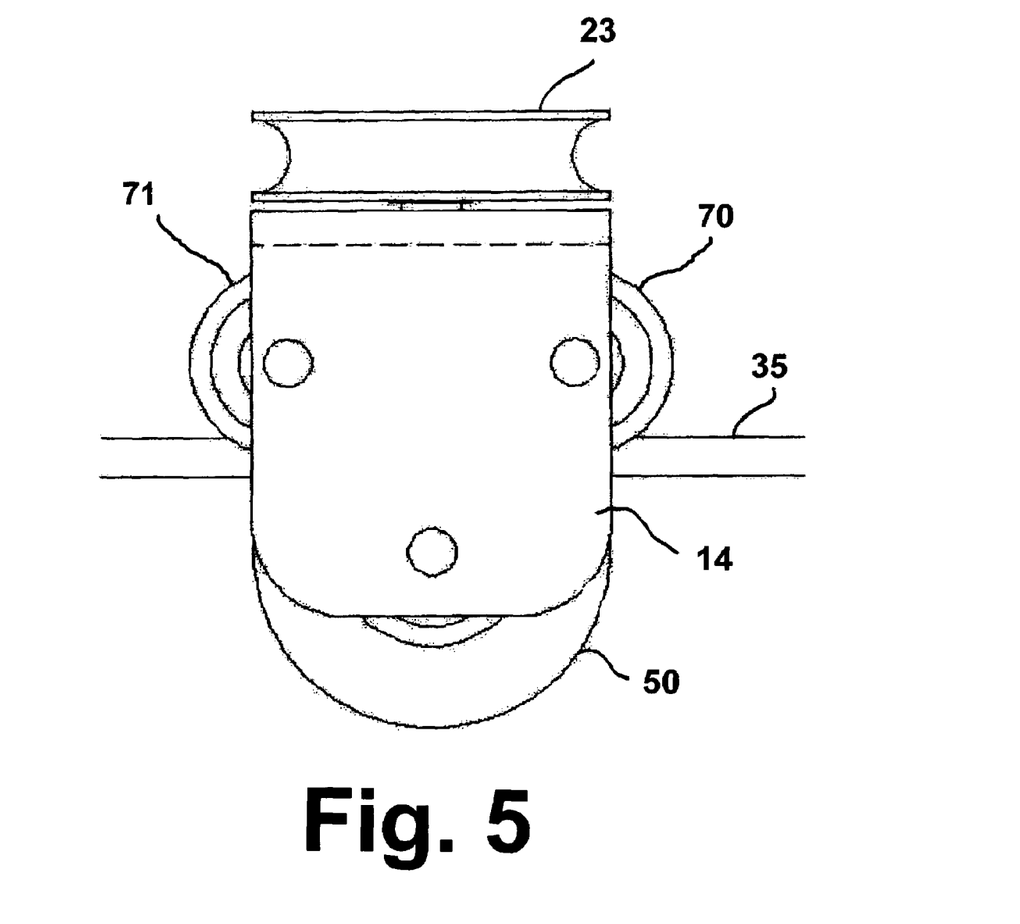
FIG. 5 is a lateral view of the lower pipe tracking contactor shown in FIG. 4.
Figure 6:
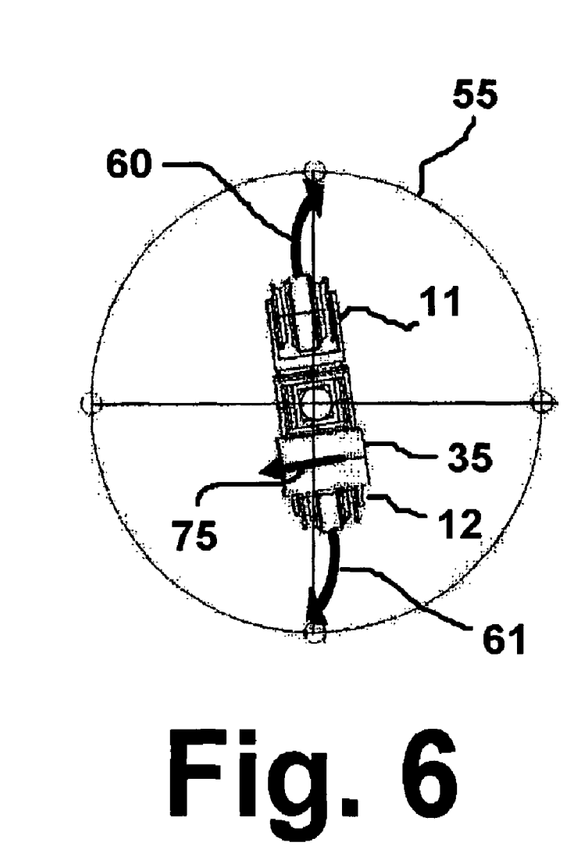
FIG. 6 is an end view of a pipe containing a self-righting, bi-directional pipe caster in accordance with one embodiment of this invention showing the effect of spiraling of the pipe caster in a first direction.
Figure 7:
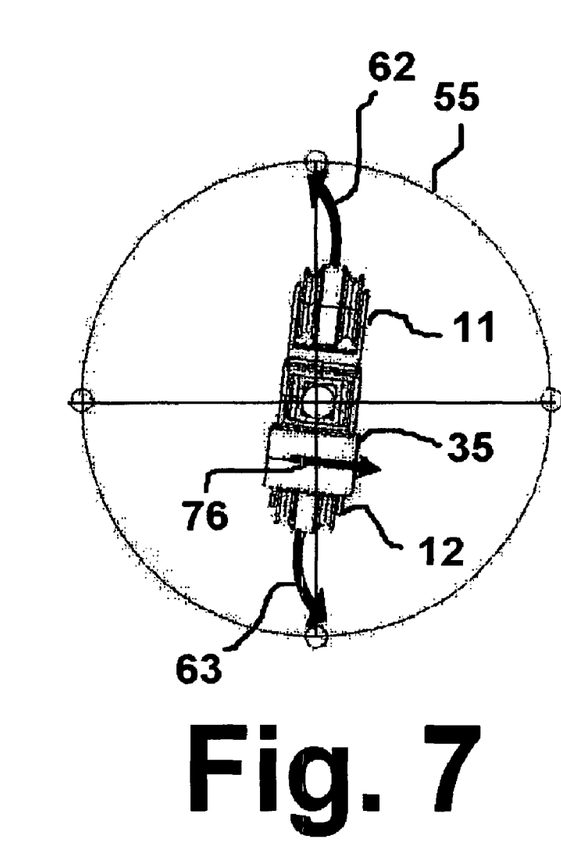
FIG. 7 is an end view of a pipe containing a self-righting, bi-directional pipe caster in accordance with one embodiment of this invention showing the effect of spiraling of the pipe caster in a second direction.

Referring to FIGS. 4 and 5, which show a pipe caster in accordance with one embodiment of this invention disposed in a pipe 55, gravity is used to control the axial path of the upper and lower pipe tracking contactors by means of the steering pendulum as follows. Looking from the front of the pipe caster, as shown in FIG. 4, a clockwise spiral of the pipe caster, indicated by arrows 60, 61, causes the steering pendulum 35 to swing to the left, indicated by arrow 75, which, in turn, results in a counterclockwise correction to bring the pipe caster back to a substantially vertical orientation. As shown in FIG. 5, a counterclockwise spiral of the pipe caster, indicated by arrows 62, 63, causes the steering pendulum 35 to swing to the right, indicated by arrow 76, which, in turn, results in a clockwise correction to bring the pipe caster back to a substantially vertical orientation.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

What is claimed is:

1. An apparatus for transporting a payload along an inside of a substantially horizontal pipe, the apparatus comprising:
   a rollable upper pipe tracking contactor and a rollable lower pipe tracking contactor, said upper pipe tracking contactor vertically spaced apart from said lower pipe tracking contactor;
   relational pivot means for pivotably connecting said upper pipe tracking contactor with said lower pipe tracking contactor;
   at least one elongated lever element having weighted ends, said at least one elongated lever element in non-fixed contact with said lower pipe tracking contactor; and
   horizontal stabilization means for maintaining said elongated lever element in a substantially horizontal orientation.

2. An apparatus in accordance with claim 1, wherein said upper pipe tracking contactor comprises at least one upper rollable element disposed within an upward facing carriage.

3. An apparatus in accordance with claim 2, wherein said lower pipe tracking contactor comprises at least one lower rollable element disposed within a downward facing carriage.

4. An apparatus in accordance with claim 3, wherein said at least one elongated lever element is in non-fixed contact with said at least one lower rollable element, creating at least one fulcrum contact point between said at least one elongated lever element and said at least one lower rollable element.

5. An apparatus in accordance with claim 4, wherein said at least one elongated lever element is in non-fixed contact with said horizontal stabilization means for maintaining said elongated lever element in a substantially horizontal orientation.

6. An apparatus in accordance with claim 5, wherein said horizontal stabilization means for maintaining said elongated lever element in a substantially horizontal orientation comprises a first grooved element connected with said lower pipe tracking contactor, said first grooved element having at least one forward groove in contact with a top portion of said at least one elongated lever element at a forward contact point ahead of said fulcrum contact point.

7. An apparatus in accordance with claim 6, wherein said horizontal stabilization means for maintaining said elongated lever element in a substantially horizontal orientation comprises a second grooved element connected with said lower pipe tracking contactor, said second grooved element having at least one rearward groove in contact with said top portion of said at least one elongated lever element at a rearward contact point behind said fulcrum contact point.

8. An apparatus in accordance with claim 2, wherein said upper pipe tracking contactor further comprises at least one spring-loaded element connected with a side wall of said upward facing carriage and with said at least one upper rollable element, said at least one spring-loaded element applying an upward force to said upper rollable element.

9. An apparatus in accordance with claim 2, wherein said upward facing carriage is a U-shaped profile.

10. An apparatus in accordance with claim 3, wherein said downward facing carriage is a U-shaped profile.

11. An apparatus in accordance with claim 2, wherein said at least one upper rollable element comprises one of a wheel and a ball.

12. An apparatus in accordance with claim 3, wherein said at least one lower rollable element comprises one of a wheel and a ball.

13. An apparatus in accordance with claim 4, wherein said lower rollable element forms at least one circumferential groove adapted to accommodate said elongated lever element.

14. An apparatus in accordance with claim 3, wherein said relational pivot means comprises a horizontally oriented upper pulley fixedly connected to a bottom of said upward facing U-shaped profile, a horizontally oriented lower pulley fixedly connected to a top of said downward facing U-shaped profile, pivotable connecting means for pivotably connecting said upper pulley with said lower pulley, said pivotable connecting means having opposed sides, at least two opposed vertically oriented side pulleys pivotably connected to said opposed sides of said pivotable connecting means, and at least one pulley belt disposed around portions of said upper pulley, said opposed side pulleys and said bottom pulley, whereby pivoting of any one of said pulleys results in pivoting of the remaining said pulleys.

15. An apparatus in accordance with claim 3, wherein said relational pivot means comprises a plurality of bevel gears aligned to provide relational pivoting of the upper and lower pipe tracking contactors, whereby pivoting of said lower pipe tracking contactor in a first direction results in pivoting of said upper pipe tracking contactor in a direction opposite to said first direction.

* * * * *